(12) United States Patent
Bell

(10) Patent No.: US 7,452,003 B2
(45) Date of Patent: Nov. 18, 2008

(54) SEAT BELT PRETENSIONER

(75) Inventor: John Forster Bell, Carlisle (GB)

(73) Assignee: Key Safety Systems, Inc., Sterling Heights, MI (US)

( * ) Notice: Subject to any disclaimer, the term of this patent is extended or adjusted under 35 U.S.C. 154(b) by 290 days.

(21) Appl. No.: 11/476,464

(22) Filed: Jun. 28, 2006

(65) Prior Publication Data

US 2007/0013186 A1      Jan. 18, 2007

(30) Foreign Application Priority Data

Jul. 12, 2005    (EP)    ................................. 05254368

(51) Int. Cl.
*B60R 22/46* (2006.01)
(52) U.S. Cl. ...................... 280/806; 297/470
(58) Field of Classification Search ................ 280/806; 297/470, 471, 472, 479; 180/268; *B60R 22/46*
See application file for complete search history.

(56) References Cited

U.S. PATENT DOCUMENTS

| | | | |
|---|---|---|---|
| 5,294,150 A | 3/1994 | Steffens, Jr. | |
| 5,624,083 A | 4/1997 | Modinger | |
| 5,871,236 A | 2/1999 | Bauer et al. | |
| 5,887,897 A | 3/1999 | Gill et al. | |
| 6,113,145 A * | 9/2000 | Evans | 280/806 |
| 6,131,951 A | 10/2000 | Chicken et al. | |
| 6,149,095 A | 11/2000 | Specht et al. | |
| 6,155,512 A | 12/2000 | Specht et al. | |
| 6,237,958 B1 | 5/2001 | Patrickson | |
| 6,238,003 B1 | 5/2001 | Miller, III et al. | |
| 6,450,435 B2 * | 9/2002 | Junker et al. | 242/374 |
| 6,527,299 B2 * | 3/2003 | Specht et al. | 280/806 |
| 6,565,121 B2 | 5/2003 | Knych et al. | |
| 6,572,147 B2 * | 6/2003 | Webber et al. | 280/806 |
| 6,682,097 B2 | 1/2004 | Krauss et al. | |

(Continued)

FOREIGN PATENT DOCUMENTS

DE    25 43 068 A1    4/1976

(Continued)

OTHER PUBLICATIONS

EEC directive 76/115 of Dec. 18, 1975 on the approximation of the laws of the Member States relating to anchorages for motor-vehicle safety belts.

*Primary Examiner*—Kevin Hurley
*Assistant Examiner*—Nicole Verley
(74) *Attorney, Agent, or Firm*—Lonnie Drayer

(57) ABSTRACT

A pretensioning apparatus for seat belt webbing is located in the vicinity of a belt anchor end of a three-point vehicle safety restraint seat belt. The pretensioning apparatus has a fixed member in the form of a tubular member that may be anchored to a vehicle seat at the belt anchor side of the vehicle. A movable member in the form of a piston is connected to the webbing in the region of the belt anchor end. A means is provided for moving the movable member relative to the fixed member in a generally horizontal direction, to move the seat belt webbing in a pretensioning direction in response to a signal from a crash sensor. A webbing guide is fixed to the seat to provide an effective anchorage point spaced from the belt anchor end of the webbing under pretensioning conditions.

11 Claims, 4 Drawing Sheets

U.S. PATENT DOCUMENTS

| | | |
|---|---|---|
| 6,840,544 B2 | 1/2005 | Prentkowski |
| 7,118,133 B2 * | 10/2006 | Bell et al. .................. 280/806 |
| 7,350,734 B2 * | 4/2008 | Stevens ..................... 242/374 |
| 7,370,885 B2 * | 5/2008 | Stevens ..................... 280/741 |
| 2005/0206153 A1 | 9/2005 | Bell et al. |

FOREIGN PATENT DOCUMENTS

| | | |
|---|---|---|
| DE | 25 48 368 A1 | 5/1977 |
| DE | 32 37 680 A1 | 4/1984 |

* cited by examiner

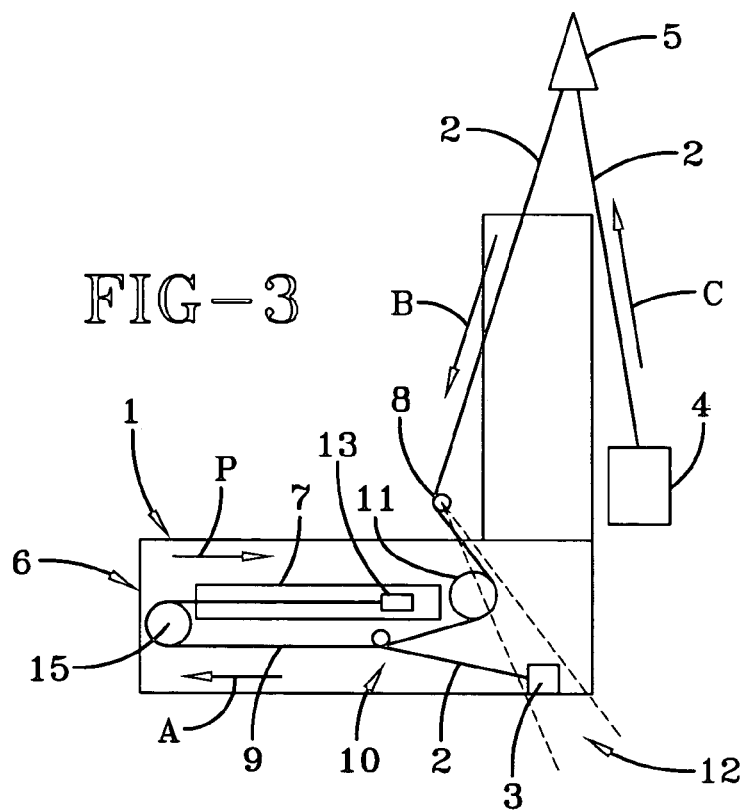
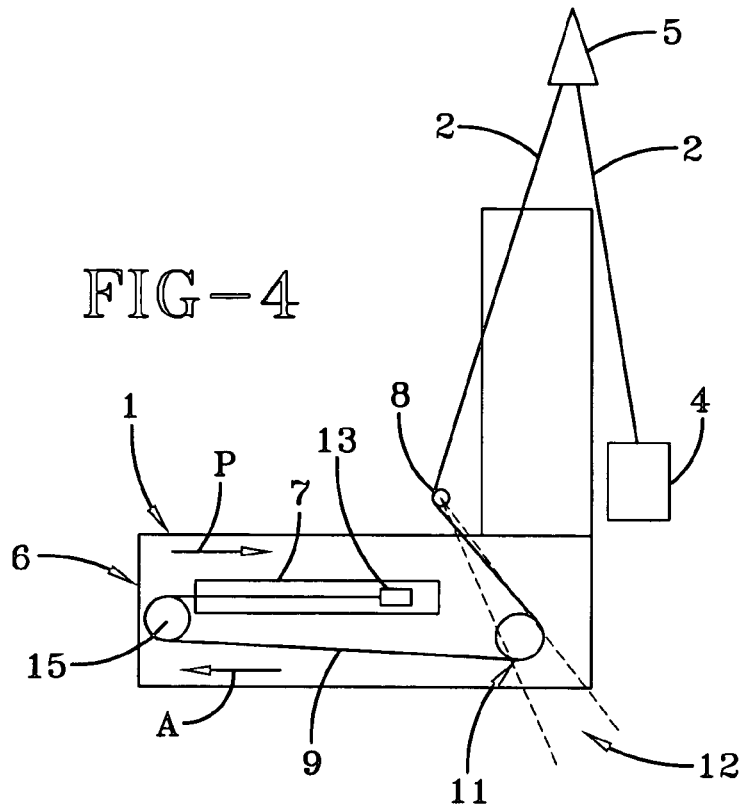

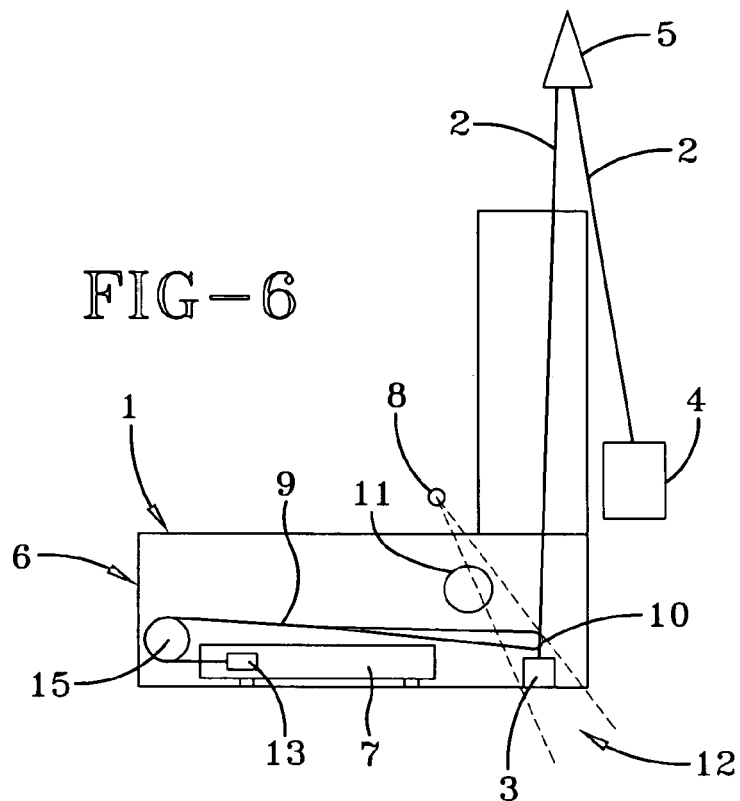
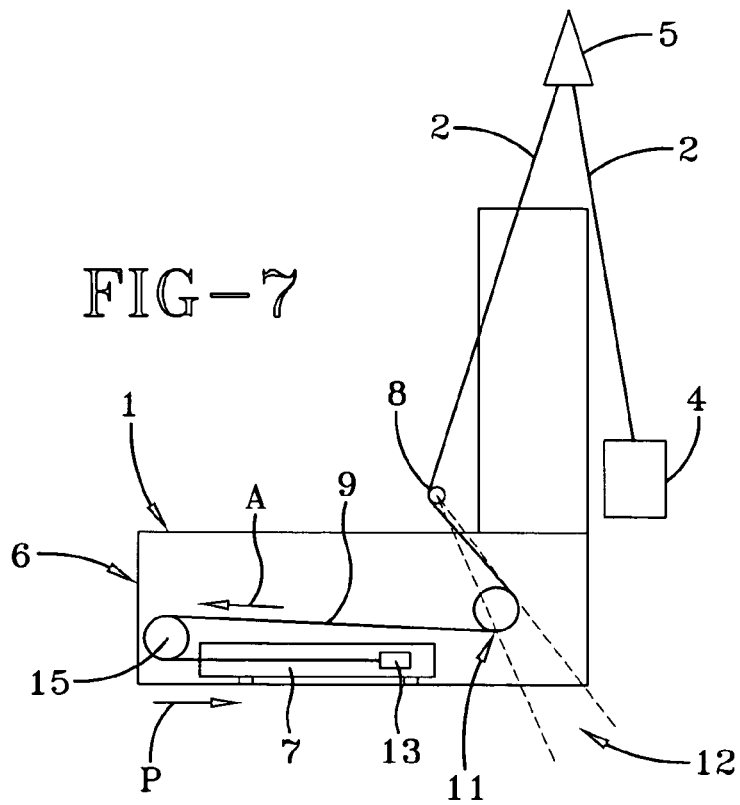

SEAT BELT PRETENSIONER

FIELD OF THE INVENTION

The present invention relates to a seat belt pretensioner.

BACKGROUND OF THE INVENTION

A typical seat belt comprises a length of belt webbing connected at three points to load bearing parts of a vehicle. Typically one end of the webbing is attached to a belt anchor that is bolted to a load bearing longitudinally extending chassis member on one side of a seat between the seat and the adjacent door. The webbing is arranged to pass laterally across the hips of a seat occupant to a buckle mechanism fixed to the vehicle on the opposite side of the seat, and then diagonally across the torso of the seat occupant, via a webbing guide, to a retractor mounted on the B pillar adjacent the door. A buckle mechanism engages a buckle tongue that is attached to the webbing in a sliding manner.

The retractor fitted at the pillar end of the webbing increases the comfort of the seat occupant restrained by the belt by allowing the webbing to pay out under relatively low loads to enable limited. This allows movement of the restrained seat occupant, for example to reach in-car entertainment controls or storage compartments. The retractor is biased to keep the webbing relatively taut about the seat occupant and a locking element is included to lock the retractor against webbing payout if an acceleration sensor senses the vehicle undergoing rapid acceleration or deceleration indicative of a crash.

In recent years, pretensioners have been introduced to rapidly pull in a length of webbing to tighten the belt about the vehicle occupant in a crash. This takes up any slack in the belt and helps to more correctly position the vehicle occupant in the seat to maximize the protection of the seat occupant provided by the seat belt and the protection of any secondary safety restraint such as an airbag.

Pretensioners use a force reservoir, such as a pyrotechnically operated gas generator, to provide an impulse of sufficient magnitude to tighten the belt in a short space of time, ideally before the crash pulse takes full effect.

Pretensioners are usually located at the retractor end of the webbing where they typically rewind the retractor mechanism to pull in a length of webbing. Pretensioners have also been used at the buckle fastening to pull back the buckle mechanism. Buckle pretensioners have the advantage that they effectively pull in twice as much webbing length for the same translational movement of the pretensioning mechanism because a single movement of the buckle will pull in both the lap and the shoulder portions of the webbing across a vehicle occupant at the same time. However there is limited space in a vehicle around a buckle fastening and there is a tendency in newer vehicles, particularly those with highly adjustable seats, for buckles to be smaller and buckle stalks to be shorter. This limits the performance of a buckle pretensioner.

DISCUSSION OF THE PRIOR ART

DE 25 48 368 A1 discloses a seat belt tightener that operates by allowing the entire vehicle seat to move forward due to the inertia of a crash. Mating abutments on the bottom of the seat and the vehicle structure limit the amount of forward movement of the seat. There is a provision for a mechanism that can multiply the amount of belt tightening with respect to the distance that the seat moves forward. While this seat belt tightening arrangement operates by pulling the belt webbing in a forward direction, with respect to vehicle travel, there is a recognized aversion to a vehicle seat moving at all during a crash because if the crash is severe enough the abutment arrangement could fail with very dire consequences for the seat occupant.

DE 3237680 A1 discloses a seat belt system wherein during a crash tightening of the lap belt is compensated for by loosening of the shoulder belt and vice versa. The anchoring end of the lap belt and the anchoring/retractor end of the shoulder belt are connected to one another using a block and tackle arrangement. The present invention addresses a more conventional pretensioning system in which both the lap and shoulder belt portions of the seat belt webbing are tensioned at the same time.

U.S. Pat. No. 4,015,860 A discloses a seat belt pretensioner that is oriented to pull on the lap belt and shoulder belt perpendicular to the direction of vehicle travel. The pretensioner has two pulling devices and is located under the vehicle seat. The present invention overcomes the need for two pulling devices with a simpler device that is also a cost improvement.

U.S. Pat. No. 6,565,121 B2 teaches a three-point seat belt system for a motor vehicle front seat having a belt tightening device that is fastened to the vehicle seat. A piston-cylinder assembly of the belt tightener may extend longitudinally with respect to the vehicle.

Pretensioners have recently been used at the belt anchor end of the webbing in the region of the adjacent doorsill. The pretensioning performance of these so-called sill pretensioners has been extremely limited because of the limits of space in this area of the vehicle, and they have not hitherto been capable alone of taking up sufficient slack in the belt webbing to satisfy safety standards. Sill pretensioners have previously only been used only to supplement retractor and buckle pretensioners. Sill pretensioners have been suggested, in US 2005/0206153 A1, to operate in conjunction with a slider bar in three door vehicles.

Known pretensioning apparatuses tend to be bulky and it is desirable to minimize their size to save space without compromising the capability to pull in a sufficient length of the seat belt webbing in the event of a crash.

SUMMARY OF THE INVENTION

According to the present invention there is provided a pretensioning apparatus for seat belt webbing at a belt anchor end of a three point vehicle safety restraint seat belt, the pretensioning apparatus comprising: a fixed member; a movable member adapted to be connected to the seat belt webbing in the region of the belt anchor end of the seat belt webbing; means for moving, in response to a signal from a crash sensor, the movable member relative to the fixed member in a generally horizontal direction, to move the seat belt webbing in a pretensioning direction; and a webbing guide fixed to the seat at the side of the seat adjacent the belt anchor end of the webbing and arranged to provide an effective anchorage point spaced from the belt anchor end of the webbing under pretensioning conditions.

BRIEF DESCRIPTION OF THE DRAWINGS

FIG. 3 shows the pretensioning apparatus of FIGS. 1 and 2 in a pretensioned configuration wherein the seat belt is restraining a seat occupant.

FIG. 4 is a schematic side view of an alternative embodiment of the pretensioner of FIGS. 1 to 3.

FIG. 6 is a schematic side view of an alternative embodiment of the pretensioner of FIGS. 1 to 3.

FIG. 7 is a schematic side view of an alternative embodiment of the pretensioner of FIG. 4.

DETAILED DESCRIPTION OF THE INVENTION

Figure 1:
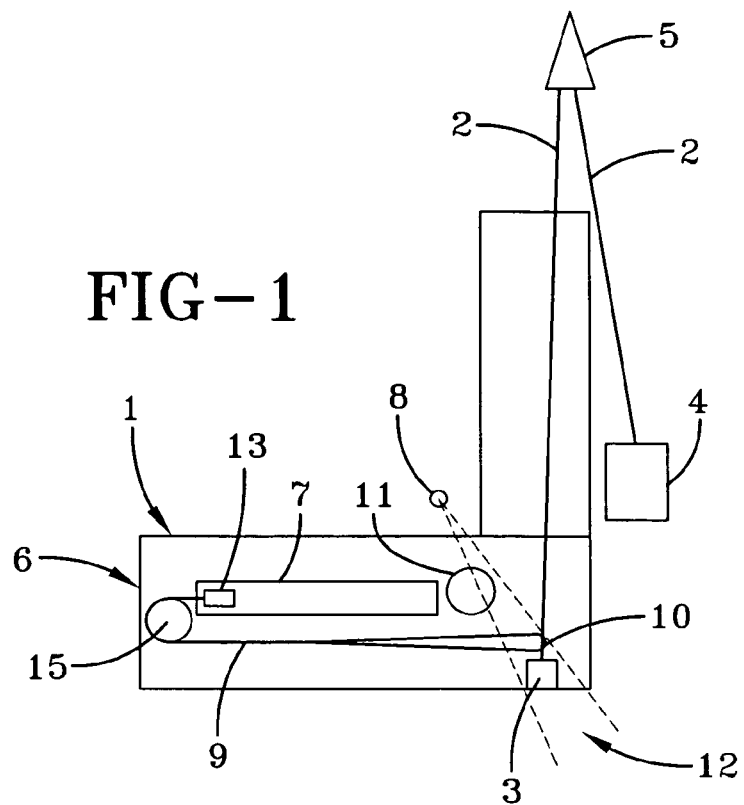
FIG. 1 is a schematic side view of a pretensioning apparatus according to a first embodiment of the present invention, in an unworn configuration wherein the seat belt is not restraining a seat occupant.

As used throughout this description, and in the claims, terms such as "forward" and "rearward", "front" and "back" and similar terms are understood to refer to directions with respect to the front and rear of a vehicle in which the seat belt pretensioning apparatus of the invention is installed. Similarly, terms such as "above" and "below", and "higher" and "lower" are understood to be relative to the normal orientation of the top and bottom of a passenger compartment of a vehicle in which the seat belt pretensioning apparatus of the invention is installed.

In all the figures a vehicle seat 1 is shown fitted with a seat belt in known manner. The seat belt comprises seat belt webbing 2, one end of which is attached to, or connected in a load bearing manner 3, to a load bearing part of the vehicle. It may be anchored to a chassis member, part of the floor of the vehicle, to a doorsill or to part of the seat 1 or the seat rail to which the seat frame is slideably attached. Preferably a tubular member, such as a cylinder 7 is anchored to a load bearing part of the seat such as the seat rail or generally parallel to it. As used herein and in the claims the word "tubular" is understood to have its common meaning of a conduit comprising a long hollow object used to hold and conduct objects, and that while a tube is usually cylindrical it may have any other appropriate cross section shape including square or rectangular. The webbing 2 passes via a webbing guide 5, such as a D-ring, to a retractor 4, typically fixed to the B pillar of a vehicle. A pretensioning unit is shown at 6 and this would typically comprise, as is well known, a piston-cylinder unit in which a piston 13 is driven along a tubular member, here a cylinder 7, usually by pyrotechnic means, in the event of a crash. The piston 13 is connected by a cable 9 to the webbing 2. A pulley 15 is located forward of the cylinder 7 to redirect the cable 9 from extending in a forward direction to a rearward direction towards the seat belt webbing 2. Here the cable 9 is shown looped around the belt webbing 2.

Seat belt pretensioners having a piston driven in a tubular member, such as a cylinder, to tighten a seat belt are disclosed, for example, in: U.S. Pat. No. 6,113,145 A; U.S. Pat. No. 6,131,951 A; U.S. Pat. No. 6,149,095 A; U.S. Pat. No. 6,155,512 A; U.S. Pat. No. 6,186,549 B1; U.S. Pat. No. 6,237,958 B1; U.S. Pat. No. 6,238,003 B1; U.S. Pat. No. 6,450,435 B2; U.S. Pat. No. 6,565,121 B2; U.S. Pat. No. 6,840,544 B2; and U.S. Pat. No. 6,682,097 B2, each of which is incorporated herein by reference to teach such a piston-tubular member/piston-cylinder device which alone or in combination with one or more of the other cited publications teaches a piston-tubular member/piston-cylinder device that may be used in the practice of the present invention.

The piston 13 is a movable member 13 housed within and movable along the interior of a tubular member, such as the cylinder 7 that is a fixed member such that the piston preferably moves in a direction generally parallel to the normal line of movement of the vehicle, i.e. a forwards-backwards line, generally parallel to a seat rail by which the seat 1 is secured to the vehicle. Most preferably the piston 13 moves in a generally horizontal backward direction and pulls the seat belt webbing 2 in a forward direction. The means for moving the piston along the tubular member may comprise a pyrotechnically activated gas generator. This makes the apparatus particularly compact.

A webbing guide 11, such as a cylinder, pulley or cone, is fixed to the seat 1 and positioned rearward of the tubular member of the pretensioning unit, in the region of the so-called R14 zone 12 shown schematically between the broken lines extending from the buckle point 8. The R14 zone is a location that recommended for sill end support of the webbing in internationally recognized safety standard specifications. The R14 specification is set forth in EEC directive 76/115 that sets forth regulations relating to anchorages for motor-vehicle safety belts in member states of the European Economic Community In the first embodiment of FIGS. 1 to 3 and 5 the sill end of the webbing 2 is anchored to the seat rail via a belt anchor 3 in a load bearing manner.

In FIG. 1 the seat belt is shown in the unworn configuration, meaning the seat belt is not fastened across the vehicle seat 2, and thus the webbing 2 passes in a generally vertical direction up the side of the seat 2 adjacent a door, from the belt anchor 3 to the webbing guide 5, such as a D-ring, as shown. The pretensioning unit 6 has not been activated.

Figure 2:
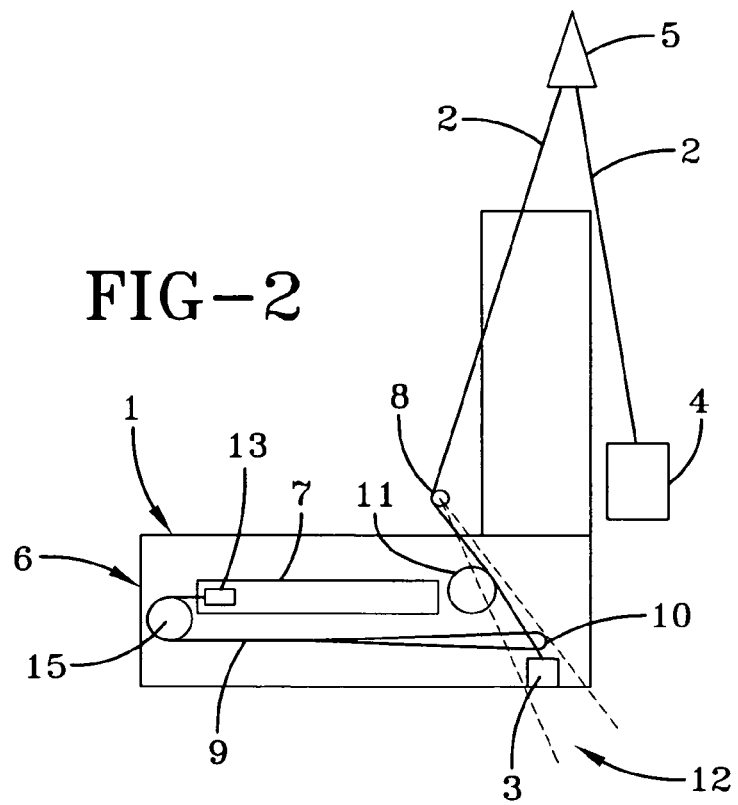
FIG. 2 shows the pretensioning apparatus of FIG. 1 in a worn configuration wherein the seat belt is restraining a seat occupant.

In FIG. 2 the seat belt is shown in the worn configuration, meaning the seat belt is fastened across the seat 1 at a buckle point schematically indicated at 8 on the opposite side of the seat from the belt anchor 3. The buckle point is the location of the buckle when the buckle is locked with the buckle tongue to secure the belt webbing around the seat occupant. Again the pretensioning unit 6 has not been activated.

In FIG. 3 the seat belt is shown in the pretensioned configuration in which the pretensioning unit 6 has been activated. The piston 13 has moved in the direction of arrow P and has pulled the cable 9 in the direction of arrow A. The cable is looped 10 around the webbing 2 in the region of the belt anchor 3 and thus pulls this portion of the webbing 2 in the direction of arrow A, drawing in any slack in the webbing along the path shown by the arrows B and C. The pretensioning unit activates in a crash when a crash sensor detects a high acceleration or deceleration, and a sensor also locks the retractor 4 against further payout of webbing in a manner well known to persons skilled in the art.

A ratchet or other form of non-return mechanism for restraining motion of the movable member in a non-pretensioning direction after pretensioning has been carried out may be built directly into the pretensioning unit 6 in known manner. Locking the pretensioner against return movement in this way prevents a loss of tension in the seat belt. For example sawtooth-shaped projections such as ratchet teeth may be built into the inside wall of the tubular member 7 and a co-operating tooth attached to the piston to allow the piston to move in the pretensioning direction A but not the opposite direction as disclosed in U.S. Pat. No. 6,113,145 A which is incorporated herein by reference for the purpose of teaching such a feature. The piston-tubular member/piston-cylinder could employ at least one locking block as a non-return mechanism as disclosed in U.S. Pat. No. 6,237,958 B1 which is incorporated herein by reference for the purpose of teaching such a feature. Ratchet mechanisms are known for different seat belt restraint applications and so the pretensioner of the present invention can advantageously be constructed using standard parts and manufacturing processes, and thus offers a relatively low cost locking mechanism.

As shown in the figures, the belt anchor 3 and the webbing guide 11 are positioned in the area labelled 12 which is known as the R14 zone from the standards of the Vehicle Anchorage Pull Test, currently known as the R14 specification, requiring the seat belt to be strong enough to withstand loads of at least 15 kN. The R14 specification is set forth in EEC directive 76/115 that sets forth regulations relating to anchorages for motor-vehicle safety belts in member states of the European Economic Community.

Figure 5:
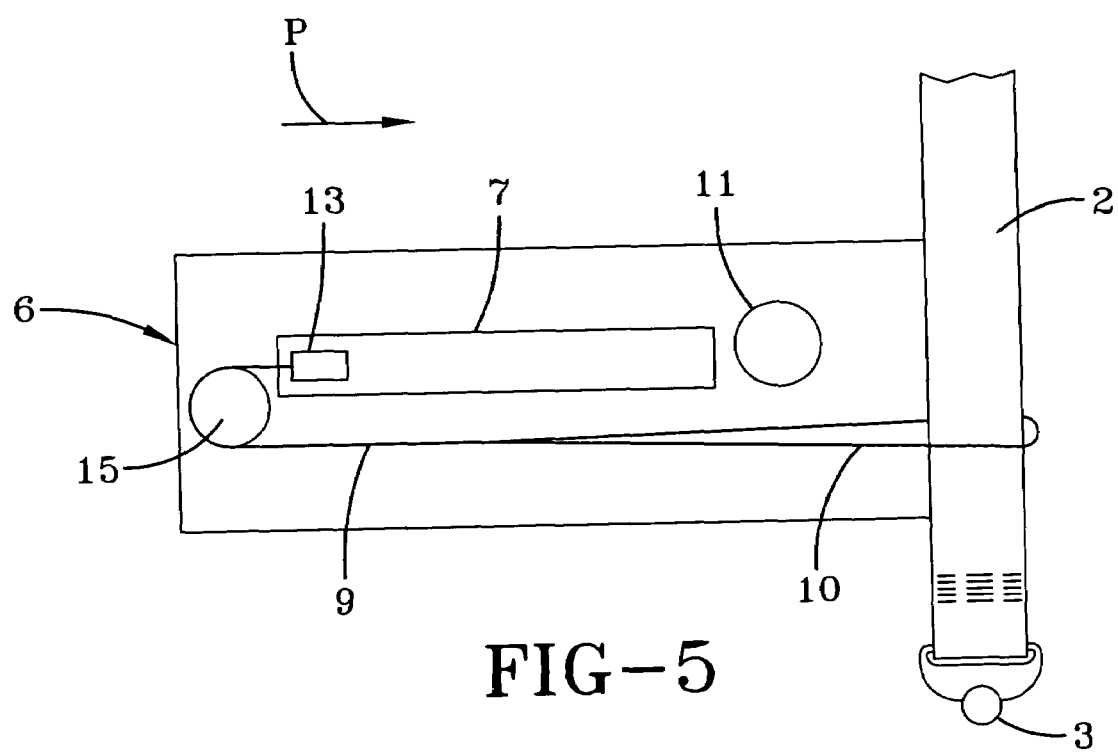
FIG. 5 is a schematic side view of part of FIG. 1 on a larger scale.

The cable 9 may be formed as a double cable looped over the webbing 2, as shown more clearly in FIG. 5.

The cable loop shown at 10 in the figures may be coated with a plastic material or encased in a plastic sheath so as to more easily slide along the webbing 2 and to protect the fabric of the webbing from chaffing by the cable.

The load bearing webbing guide 11 fixed to the seat 1 improves the performance of the pretensioning apparatus because it makes the cable 9 travel along a path more nearly parallel to and closer to the line of force exerted by the pretensioning unit 6. The line of force is the pulling force of the cable in a forward direction. Preferably the arrangement is such that the cable is angled to the line of force of the pretensioning unit 6 by no more than 30 degrees. This increase in performance means that a shorter pretensioning unit 6 can be used to achieve the same pretensioning effect, that is to pull in the same length of webbing slack.

The webbing guide 11 changes the direction of the webbing 2 and enables the pretensioning unit 6 to be sited along the base of the seat squab, and it can therefore be as long as the depth of the seat itself. Previously for sill pretensioners the pretensioning unit itself had to be sited effectively behind the belt anchor which took up valuable space behind any seat and limited the size of the unit thus limiting the effectiveness of its pretensioning capacity. This was especially true with the slider bar sill pretensioner described in US 2005/0206153 A1.

The piston 13 which is a movable means is preferably connected or connectable to the seat belt webbing 2 between the webbing guide 11 and the belt anchor 3, for example by being looped 10 around the webbing or connectable by a quick attachment device. This positioning has the advantage of pulling in a total length of webbing equal to twice the distance moved by the piston, allowing the pretensioner to be more compact and more efficient than known sill pretensioners.

In FIG. 4 an alternative embodiment is shown in which the belt anchor end of the webbing 2 is directly connected to the piston 13 of the pretensioning unit 6 via the cable 9. The webbing guide 11 is positioned slightly lower on the structure of the seat 1 in this embodiment to provide an effective load bearing anchor point close to the line of the cable 9. U.S. Pat. No. 6,238,003 B1 is incorporated herein by reference to teach a structure for attaching the seat belt webbing to the end of the cable.

FIG. 5 illustrates the embodiment of FIGS. 1 to 3 in more detail and particularly shows one way in which the cable 9 can be attached to the belt webbing 2 by a loop 10 encompassing the webbing 2 just above the belt anchor 3. The cable 9 is attached to the piston 13 of the pretensioning unit 6 which moves in the direction of arrow P to pull in the cable and take slack out of the webbing 2 by moving it in the direction of arrow A to engage the webbing guide 11.

FIG. 6 is a schematic side view of an alternative embodiment of the pretensioning apparatus of FIGS. 1 to 3 with the fixed member which is the tubular member, in this example a cylinder 7, fixed to the floor or door sill of a vehicle in the vicinity of the base of a vehicle seat.

FIG. 7 is a schematic side view of an alternative embodiment of the pretensioning apparatus of FIG. 4 with the fixed member, which is the tubular member, in this example a cylinder 7, fixed to the floor or door sill of a vehicle in the vicinity of the base of a vehicle seat.

The seat belt pretensioner of the invention may be used in three door vehicles as well as four or five door vehicles because it is so compact and can be located within the footprint of the seat so it does not restrict access to rear seats when fitted in the front seats of a three door vehicle, nor take up storage space when fitted in rear seats of any vehicle.

While there has been described in connection with the exemplary embodiments of the present invention, it will be obvious to those skilled in the art that various changes and modifications may be made therein without departing from the invention, and it is aimed, therefore, to cover in the appended claim all such changes and modifications as fall within the true spirit and scope of the invention.

I claim:

1. A pretensioning apparatus for tensioning a seat belt webbing of a three point seat belt that is installed in a vehicle, an end of the seat belt webbing being located in the vicinity of both a door sill and a seat base, the pretensioning apparatus comprising:
   a tubular member in a fixed position relative to and in the vicinity of the seat base such that the tubular member extends in a direction going from the front of the vehicle towards the rear of the vehicle;
   a piston located inside the tubular member and movable along the tubular member, the piston being connected to the seat belt webbing via an elongate member, a first end of the elongate member being connected to the piston with the elongate member also being connected to the seat belt webbing; and
   a means for moving the piston in a direction towards the rear of the vehicle thereby effecting in combination with a seat belt webbing guide located rearward of the tubular member a movement of the seat belt webbing in a direction toward the front of the vehicle during a crash.

2. The pretensioning apparatus according to claim 1 wherein the end of the seat belt webbing is attached to a belt anchor that is located in the vicinity of both the door sill and the seat base and the elongate member is looped around the seat belt webbing in the vicinity of the belt anchor.

3. The pretensioning apparatus according to claim 1 wherein the elongate member comprises a metal cable.

4. The pretensioning apparatus according to claim 1 wherein the tubular member is anchored to the vehicle seat.

5. The pretensioning apparatus according to claim 1 wherein the tubular member is anchored to the seat at the side of the seat adjacent the belt anchor end of the webbing.

6. A pretensioning apparatus for tensioning a seat belt webbing of a three point seat belt that is installed in a vehicle, the pretensioning apparatus comprising:
   a tubular member anchored to a load bearing part of a vehicle seat such that the tubular member extends in a direction going from the front of the vehicle towards the rear of the vehicle, the tubular member being located forward of a location where an end of the seat belt webbing is anchored to a load bearing part of the vehicle in the vicinity of both a door sill and a base of the vehicle seat;
   a piston located inside of the tubular member, the piston being movable along the tubular member towards the rear of the vehicle in the event of a vehicle crash;

a seat belt webbing guide fixed to the seat rearward of the tubular member and forward of the location where the end of the seat belt webbing is anchored to a load bearing part of the vehicle;

a cable having a first end that is attached to the piston, the cable extending from the piston in a forward direction then around a pulley that redirects the cable in a rearward direction, the cable being looped around the seat belt webbing in the vicinity of the location where the seat belt webbing is anchored to a load bearing part of the vehicle; and when the piston is moved rearward along the interior of the tubular member the cable pulls the seat belt webbing toward the front of the vehicle with the seat belt coming into contact with the seat belt webbing guide.

7. The pretensioning apparatus according to claim 6 wherein the cable comprises a metal cable coated with plastic material.

8. The pretensioning apparatus according to claim 6 wherein the tubular member extends in a generally horizontal direction.

9. A pretensioning apparatus for tensioning a seat belt webbing of a three point seat belt that is installed in a vehicle, the pretensioning apparatus comprising:

a tubular member anchored to a load bearing part of a floor or door sill of a vehicle in the vicinity of a base of a vehicle seat such that the tubular member extends in a direction going from the front of the vehicle towards the rear of the vehicle, the tubular member being located forward of a location where an end of the seat belt webbing is anchored to a load bearing part of the vehicle in the vicinity of both a door sill and the base of the vehicle seat;

a piston located inside of the tubular member, the piston being movable along the tubular member towards the rear of the vehicle in the event of a vehicle crash;

a seat belt webbing guide fixed to the vehicle rearward of the tubular member and forward of the location where the end of the seat belt webbing is anchored to a load bearing part of the vehicle;

a cable having a first end that is attached to the piston, the cable extending from the piston in a forward direction then around a pulley that redirects the cable in a rearward direction, the cable being looped around the seat belt webbing in the vicinity of the location where the seat belt webbing is anchored to a load bearing part of the vehicle; and when the piston is moved rearward along the interior of the tubular member the cable pulls the seat belt webbing toward the front of the vehicle with the seat belt coming into contact with the seat belt webbing guide.

10. The pretensioning apparatus according to claim 9 wherein the cable comprises a metal cable coated with plastic material.

11. The pretensioning apparatus according to claim 9 wherein the tubular member extends in a generally horizontal direction.

* * * * *